(12) United States Patent
Pellegrini

(10) Patent No.: US 7,969,069 B2
(45) Date of Patent: Jun. 28, 2011

(54) ENERGY TRANSDUCER AND METHOD

(75) Inventor: Gerald N. Pellegrini, Worcester, MA (US)

(73) Assignee: Dove Research LLC, Wellesley, MA (US)

( * ) Notice: Subject to any disclaimer, the term of this patent is extended or adjusted under 35 U.S.C. 154(b) by 0 days.

(21) Appl. No.: 12/543,312

(22) Filed: Aug. 18, 2009

(65) Prior Publication Data

US 2010/0176693 A1 Jul. 15, 2010

Related U.S. Application Data

(60) Provisional application No. 61/144,315, filed on Jan. 13, 2009.

(51) Int. Cl.
*H01L 41/08* (2006.01)

(52) U.S. Cl. ......................... 310/339; 310/328

(58) Field of Classification Search ..................... 310/26
See application file for complete search history.

(56) References Cited

U.S. PATENT DOCUMENTS

| | | | | | |
|---|---|---|---|---|---|
| 4,944,222 | A | * | 7/1990 | Tyren | 101/93.29 |
| 5,703,553 | A | * | 12/1997 | Bushko et al. | 335/215 |
| 5,880,542 | A | * | 3/1999 | Leary et al. | 310/26 |
| 6,139,648 | A | * | 10/2000 | Wun-Fogle et al. | 148/121 |
| 6,870,716 | B2 | * | 3/2005 | Gill | 360/324.12 |
| 7,218,067 | B2 | * | 5/2007 | Marioni | 318/118 |
| 7,255,290 | B2 | * | 8/2007 | Bright et al. | 239/102.2 |

* cited by examiner

*Primary Examiner* — Mark Budd
(74) *Attorney, Agent, or Firm* — Cesari and McKenna, LLP

(57) ABSTRACT

The invention is an energy transducer that utilizes a material's internal energy as an energy source by operating in a cycle where there is a net loss in the material's internal energy without the need to raise the temperature of the material above ambient temperature. The invention is accomplished by the use of selected materials in which the material's mechanical strain, magnetization or electric polarization can be controlled by cross coupling forces, and where the cross coupling coefficients are not equal to each other in finite operating regions.

10 Claims, 3 Drawing Sheets

ENERGY TRANSDUCER AND METHOD

CROSS REFERENCE TO RELATED APPLICATION

This application is related, and claims priority, to Provisional Application No. 61/144,315, filed on Jan. 13, 2009, the entirety of which is expressly incorporated herein by reference.

BACKGROUND OF THE INVENTION

Materials with electric, magnetic, and elastic properties have been used for various applications for a long time. The electric properties of dielectric materials have been used in capacitors. The magnetic properties of permeable materials have been used in inductors. The elastic properties of certain materials have been used in springs. When in use these materials store and release energy at different times during their operating cycle via their internal forces of constraint that are require to maintain the material's physical properties.

Subclasses of these materials are materials in which there is a cross coupling of forces. Such cross coupling is exhibited in: piezoelectric[1] materials where mechanical strain is a function of electric fields, and electric polarization is a function of mechanical stress; in magnetostrictive materials where mechanical strain is a function of magnetic fields, and magnetization is a function of mechanical stress; and in magnetoelectric materials where electric polarization is a function of magnetic fields, and magnetization is a function of electric fields.

[1] The term "piezoelectric material" is meant to include any material whose mechanical properties depend on an electric field. This may include materials also known as electrostrictive materials.

These materials that exhibit cross coupling have been used in various transducer applications such as actuators and sensors. In general energy can be transformed from one form to another through this cross coupling. For example, in an actuator application electrical energy can be transformed into mechanical energy by means of piezo-electric or magnetostrictive materials.

However, none of the prior uses of these "cross coupled" materials has taken advantage of certain material properties through which a net loss of the material's internal energy over a complete cycle of operation is achieved without the need to raise the temperature of the material above ambient temperature.

SUMMARY OF THE INVENTION

The invention relates to generating mechanical energy by the cyclic control of a material's elastic properties, or electrical energy by the cyclic control of a material's polarization or magnetization properties, in such a manner that there is a net energy loss in the material's internal energy following a complete cycle period. The invention accomplishes this without the need to raise the temperature of the material above ambient temperature.

The above-mentioned control is accomplished by use of materials in which the internal forces of constraint are such that the physical properties of mechanical strain, electric polarization, and magnetization are not functions only of the direct forces (i.e., mechanical stress, electric field, and magnetic field respectively), but also depend upon "cross coupling forces". By controlling the material's internal forces of constraint, through these cross coupling forces, the total energy released by the material can be made greater than the total energy stored by the material over a complete cycle and a net energy loss in the material's internal energy can be achieved.

Examples of these cross coupling forces are as follows:

In the case of piezoelectric materials, mechanical strain depends upon the electric fields, and electric polarization depends upon the mechanical stress. The degree to which a particular material's mechanical strain depends upon the electric field is parameterized by the material's strain/electric-field coupling coefficient. The degree to which a particular material's electric polarization depends upon the mechanical stress is parameterized by a polarization/stress coupling coefficient. These coefficients represent the cross coupling coefficients for the piezoelectric material.

In the case of magnetostrictive materials, mechanical strain depends upon the magnetic fields, and magnetization depends upon the mechanical stress. The degree to which a particular material's mechanical strain depends upon the magnetic field is parameterized by strain/magnetic-field coupling coefficient. The degree to which a particular material's magnetization depends upon the mechanical stress is parameterized by the material's magnetization/stress coupling coefficient. These coefficients represent the cross coupling coefficients for the magnetostrictive material.

Similarly, in the case of magnetoelectric materials, electric polarization depends upon the magnetic fields, and magnetization depends upon the electric fields. The degree to which a particular material's electric polarization depends upon the magnetic field is parameterized by the material's polarization/magnetic-field coupling coefficient. The degree to which a particular material's magnetization depends upon the electric field is parameterized by the material's magnetization/electric-field coupling coefficient. These coefficients represent the cross coupling coefficients for the magnetoelectric material.

A net energy loss in the material's internal energy following a complete cycle period may be achieved by the selection of materials in which hysteresis and resistive losses are relatively low and in which the cross-coupling coefficients (expressed in the proper units) are not equal to each other[2], and by the proper control of the material's physical properties by means of control of the cross coupling forces.

[2] The wide variety in the properties of these types of materials allow for such a selection.

DETAILED DESCRIPTION OF ILLUSTRATIVE EMBODIMENTS

In all the following analysis it will be assumed that hysteresis and resistive eddy current losses in the materials are negligible (i.e., cyclic processes for the dynamic variables are essentially reversible).

Figure 1:
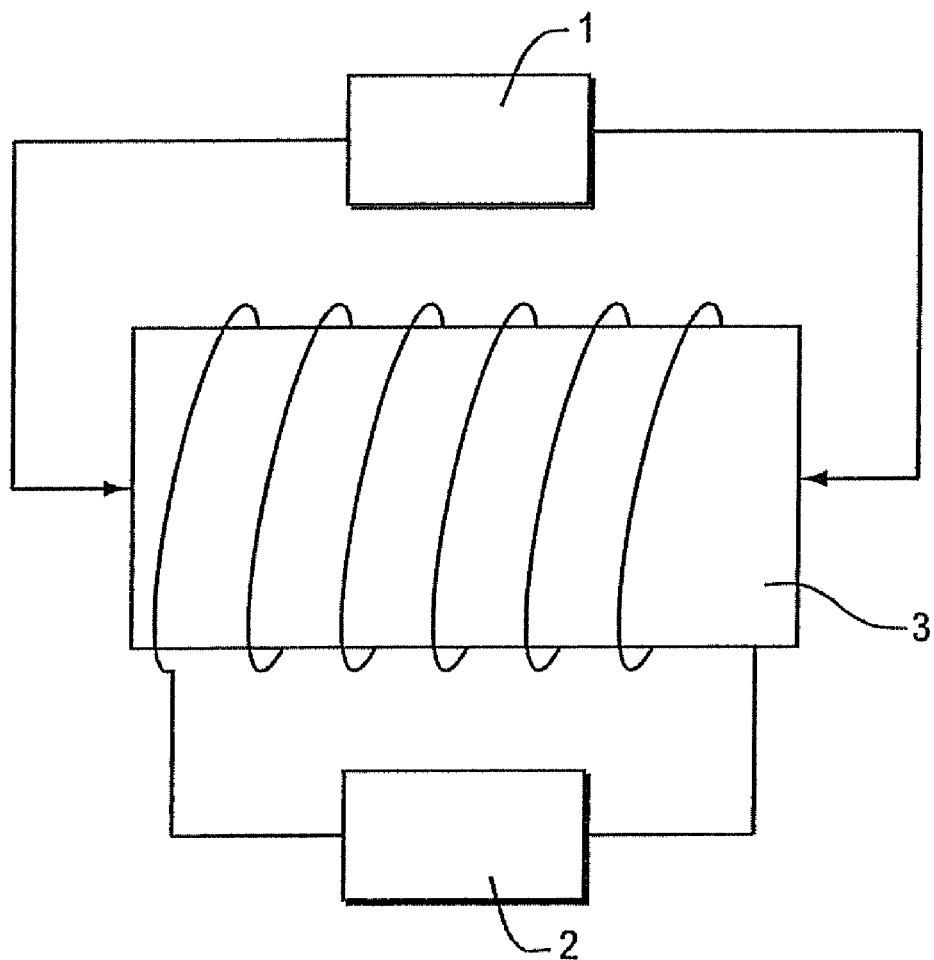
FIG. 1 is a schematic drawing of an embodiment of the invention in the case of magnetostrictive materials.

Referring to FIG. 1, we will consider a first example of the invention where a magnetostrictive material (3) is used. To describe the material's coupling response quantitatively we use the following standard coupled constitutive equations (for positive magnetostriction) used in the linear approximations (valid for small variations in the stresses and fields)[3],

[3] The non-linear case would simply express this relation in terms of differentials.

$$s = \frac{\sigma}{Y} - \alpha \cdot H \quad (1)$$

$$\mu_0 \cdot M = \mu_0 \cdot \chi_m \cdot H - \beta \cdot \sigma$$

where s is the compression strain, σ is the compression stress, $\mu_0$ is the permeability of free space, $\chi_m$ is the magnetic susceptibility, Y is the Young's modulus of elasticity, H is the magnetic field strength, M is the magnetization, α is the stain/magnetic-field coefficient and is a measure of the change in strain with magnetic field at constant stress, and β is the magnetization/stress coefficient and is a measure of the change in M with stress at constant magnetic field. α and β are the cross coupling coefficients assumed both to be positive.

From these equations it is seen that the material exhibits magnetostrictive behavior in that the mechanical strain depends on the magnetic field strength, which dependence is quantified by the coefficient α, and the magnetization depends on the mechanical stress, which dependence is quantified by the coefficient β.

The operation of the invention can be achieved with proper control of the cross coupling forces for all magnetostrictive materials having negligible hysteresis and eddy current losses (i.e., essentially reversible magnetomechanical processes), and with proper material selection[4] such that the cross coupling coefficients α and β are not equal to each other.

[4] An example of such a material is single crystal "Galfenol" as described by S. Datta et. al. SPIE 2008 Paper #6929-71.

To demonstrate the operation of the invention to generate electrical energy in such a manner that there is a net energy loss in the material's internal energy, we use a material in which β is larger than α. We also assume the material (3) is subjected to a sinusoidal magnetic field from an electrical system (2). A mechanical stress from a mechanical system (1) is imposed on the material (3) to control the magnetization. The stress and magnetic field are:

$$\sigma = \sigma_0 \cdot \sin(\theta)$$

$$H = H_0 \cdot \cos(\theta)$$

where θ is the phase angle of the cycle period (i.e., $\theta = 2\pi$ represents a complete cycle).

The total mechanical work done on the material is equal to the integral of the mechanical stress times the differential of the mechanical strain. The later being the energy conjugate physical property to stress. Using the constitutive equations (Eqs. 1) we can now calculate the total mechanical work per unit volume done on the material (3) by the mechanical system (1) over the complete cycle as:

$$W_m = \oint \sigma \cdot ds$$

$$= \sigma_0 \oint \sin(\theta) \cdot \left(\frac{\sigma_0}{Y} \cdot \cos(\theta) + \alpha \cdot H_0 \cdot \sin(\theta)\right) \cdot d\theta$$

$$= \pi \cdot \alpha \cdot \sigma_0 \cdot H_0$$

This value is positive representing the fact that after a complete cycle mechanical energy from the mechanical system (1) has been supplied to the material (3) with a corresponding gain in the material's internal energy.

The total electrical work done on the material is equal to the integral of the magnetic field times the differential of the magnetization (times $\mu_0$). The later being the energy conjugate physical property to the magnetic field. Using again the constitutive equations (Eqs. 1) we can now calculate the total electrical work per unit volume done on the material (3) by the electrical system (2) over the complete cycle as:

$$W_e = \oint \mu_0 \cdot H \cdot dM$$

$$= H_0 \oint \cos(\theta) \cdot (-\mu_0 \cdot \chi_m \cdot H_0 \sin(\theta) - \beta \cdot \sigma_0 \cdot \cos(\theta)) \cdot d\theta$$

$$= -\pi \cdot \beta \cdot \sigma_0 \cdot H_0$$

This value is negative representing the fact that after a complete cycle electrical energy has been generated and supplied to the electrical system (2) from the material (3) with a corresponding loss in the material's internal energy.

Since we have chosen to use a material in which β is larger than α the material's internal energy has a net loss after a complete cycle in which the material (3) has returned to its original magnetomechanical state.

It is to be appreciated that there is no requirement at any time in the operation of the invention that the temperature of the material be raised above the ambient temperature.

A second example embodiment is as follows:

To demonstrate the operation of the invention to generate mechanical energy in such a manner that there is a net energy loss in the material's internal energy, we use a material (3) in which β is smaller than α. We also assume the material (3) is subjected to a sinusoidal mechanical stress from a mechanical system (1). A magnetic field from an electrical system (2) is used to control the mechanical strain. The stress and magnetic field are:

$$\sigma = \sigma_0 \cdot \sin(\theta)$$

$$H = -H_0 \cdot \cos(\theta)$$

Using again the constitutive equations (Eqs. 1) we can now calculate the total mechanical work per unit volume done on the material (3) by the mechanical system (1) over the complete cycle as:

$$W_m = \oint \sigma \cdot ds$$

$$= \sigma_0 \oint \sin(\theta) \cdot \left(\frac{\sigma_0}{Y} \cdot \cos(\theta) - \alpha \cdot H_0 \cdot \sin(\theta)\right) \cdot d\theta$$

$$= -\pi \cdot \alpha \cdot \sigma_0 \cdot H_0$$

This value is negative representing the fact that after a complete cycle mechanical energy has been generated and supplied to the mechanical system (1) from the material (3) with a corresponding loss in the material's internal energy.

Using again the constitutive equations (Eqs. 1) we can now calculate the total electrical work per unit volume done on the material (3) by the electrical system (2) over the complete cycle as:

$$W_e = \oint \mu_0 \cdot H \cdot dM$$
$$= -H_0 \oint \cos(\theta) \cdot (\mu_0 \cdot \chi_m \cdot H_0 \sin(\theta) - \beta \cdot \sigma_0 \cdot \cos(\theta)) \cdot d\theta$$
$$= \pi \cdot \beta \cdot \sigma_0 \cdot H_0$$

This value is positive representing the fact that after a complete cycle electrical energy from the electrical system (2) has been supplied to the material (3) with a corresponding gain in the material's internal energy.

Since we have now chosen to use a material in which $\beta$ is smaller than $\alpha$ the material's internal energy has again a net loss after a complete cycle in which the material (3) has returned to its original magnetomechanical state.

Also, again there is no requirement at any time in the operation of the invention that the temperature of the material be raised above the ambient temperature.

Figure 2:
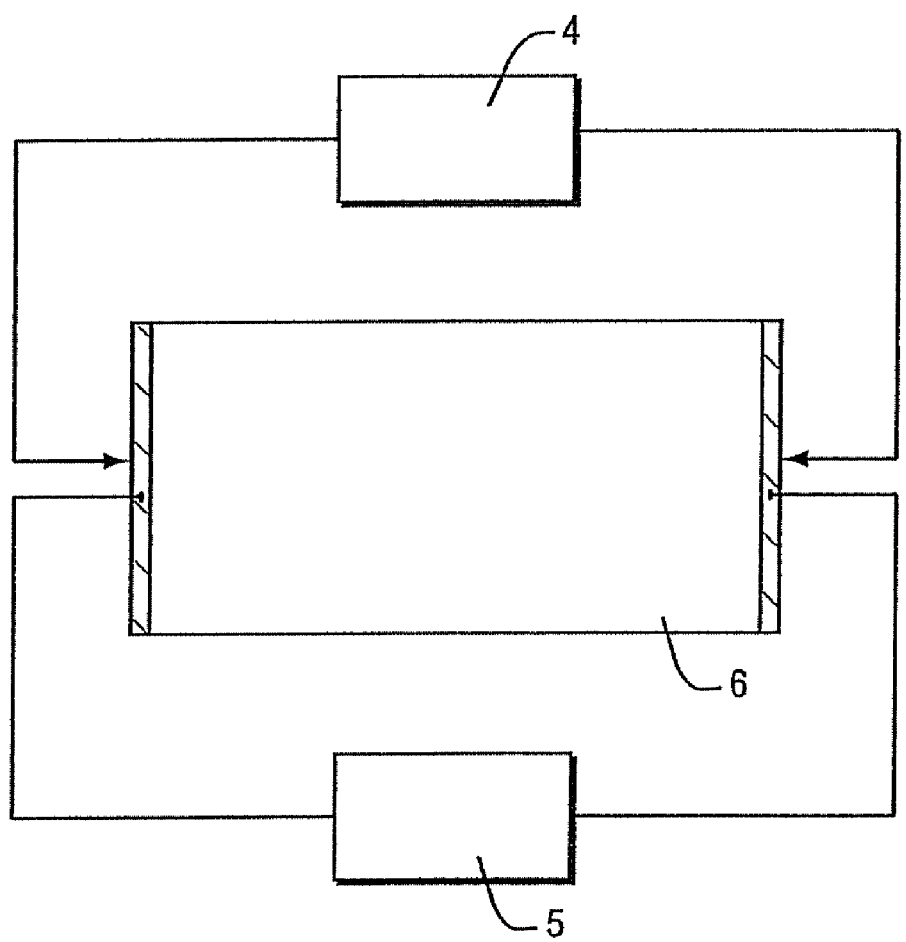
FIG. 2 is a schematic drawing of an embodiment of the invention in the case of piezo-electric materials.

Referring to FIG. 2, in a similar way piezoelectric materials may be used in the invention as follows.

For piezoelectric materials the constitutive equations analogous to Eqs. 1 are:

$$s = \frac{\sigma}{Y} - \delta \cdot E \quad (2)$$
$$P = \varepsilon_0 \cdot \chi_e \cdot E - \gamma \cdot \sigma$$

where E is the electric field, $\varepsilon_0$ is the permittivity of free space, P is the electric polarization, $\chi_e$ is the electric susceptibility, $\delta$ is the strain/electric-field coefficient and is a measure of the change in strain with electric field at constant stress, and $\gamma$ is the electric polarization/stress coefficient and is a measure of the change in P with stress at constant electric field. In this case $\delta$ and $\gamma$ are the cross coupling coefficients.

To demonstrate the operation of the invention to generate electrical energy in such a manner that there is a net energy loss in the material's internal energy, we use a material (6) in which $\gamma$ is larger than $\delta$. We also assume the material (6) is subjected to a sinusoidal electric field from an electrical system (5). A mechanical stress from a mechanical system (4) is used to control the electric polarization. The stress and electric field are:

$$\sigma = \sigma_0 \cdot \sin(\theta)$$

$$E = E_0 \cdot \cos(\theta)$$

where $\theta$ is the phase angle of the cycle period (i.e., $\theta = 2\pi$ represents a complete cycle).

Using the constitutive equations (Eqs. 2) we can now calculate the total mechanical work per unit volume done on the material (6) by the mechanical system (4) over the complete cycle as:

$$W_m = \oint \sigma \cdot ds$$
$$= \sigma_0 \oint \sin(\theta) \cdot \left(\frac{\sigma_0}{Y} \cdot \cos(\theta) + \delta \cdot E_0 \cdot \sin(\theta)\right) \cdot d\theta$$
$$= \pi \cdot \delta \cdot \sigma_0 \cdot E_0$$

This value is positive representing the fact that mechanical energy from the mechanical system (4) has been supplied to the material (6) with a corresponding gain in the material's internal energy after a complete cycle.

In this case the total electrical work done on the material is equal to the integral of the electric field times the differential of the electric polarization. The later being the energy conjugate physical property to the electric field. Using again the constitutive equations (Eqs. 2) we can now calculate the total electrical work per unit volume done on the material (6) by the electrical system (5) over the complete cycle as:

$$W_e = \oint E \cdot dP$$
$$= E_0 \oint \cos(\theta) \cdot (-\varepsilon_0 \cdot \chi_e \cdot E_0 \sin(\theta) - \gamma \cdot \sigma_0 \cdot \cos(\theta)) \cdot d\theta$$
$$= -\pi \cdot \gamma \cdot \sigma_0 \cdot E_0$$

This value is negative representing the fact that after a complete cycle electrical energy has been generated and supplied to the electrical system (5) from the material (6) with a corresponding loss in the material's internal energy.

Since we have chosen to use a material in which $\gamma$ is larger than $\delta$ the material's internal energy has a net loss after a complete cycle in which the material (6) has returned to its original electromechanical state.

It is to be again appreciated that there is no requirement in the operation of the invention that the temperature of the material be raised above the ambient temperature at any time.

To demonstrate the operation of the invention to generate mechanical energy in such a manner that there is a net energy loss in the material's internal energy, we use a material (6) in which $\gamma$ is smaller than $\delta$. We also assume the material (6) is subjected to a sinusoidal mechanical stress from a mechanical system (4). An electric field from an electrical system (5) is used to control the mechanical strain. The stress and electric field are:

$$\sigma = \sigma_0 \cdot \sin(\theta)$$

$$E = -E_0 \cdot \cos(\theta)$$

where $\theta$ is the phase angle of the cycle period (i.e., $\theta = 2\pi$ represents a complete cycle).

Using again the constitutive equations (Eqs. 2) we can now calculate the total mechanical work per unit volume done on the material (6) by the mechanical system (4) over the complete cycle as:

$$W_m = \oint \sigma \cdot ds$$
$$= \sigma_0 \oint \sin(\theta) \cdot \left(\frac{\sigma_0}{Y} \cdot \cos(\theta) - \delta \cdot E_0 \cdot \sin(\theta)\right) \cdot d\theta$$
$$= -\pi \cdot \delta \cdot \sigma_0 \cdot E_0$$

This value is negative representing the fact that after a complete cycle mechanical energy has been generated and supplied to the mechanical system (4) from the material (6) with a corresponding loss in the material's internal energy.

Using again the constitutive equations (Eqs. 2) we can now calculate the total electrical work per unit volume done on the material (6) by the electrical system (5) over the complete cycle as:

$$W_e = \oint E \cdot dP$$

$$= -E_0 \oint \cos(\theta) \cdot (\varepsilon_0 \cdot \chi_e \cdot E_0 \sin(\theta) - \gamma \cdot \sigma_0 \cdot \cos(\theta)) \cdot d\theta$$

$$= \pi \cdot \gamma \cdot \sigma_0 \cdot E_0$$

This value is positive representing the fact that electrical energy has been supplied from the electrical system (5) to the material (6) with a corresponding gain in the material's internal energy after a complete cycle.

Since we have chosen to use a material in which $\gamma$ is smaller than $\delta$ the material's internal energy has a net loss after a complete cycle where the material (6) has returned to its original electromechanical state.

It is to be again appreciated that there is no requirement in the operation of the invention that the temperature of the material be raised above the ambient temperature at any time.

Figure 3:
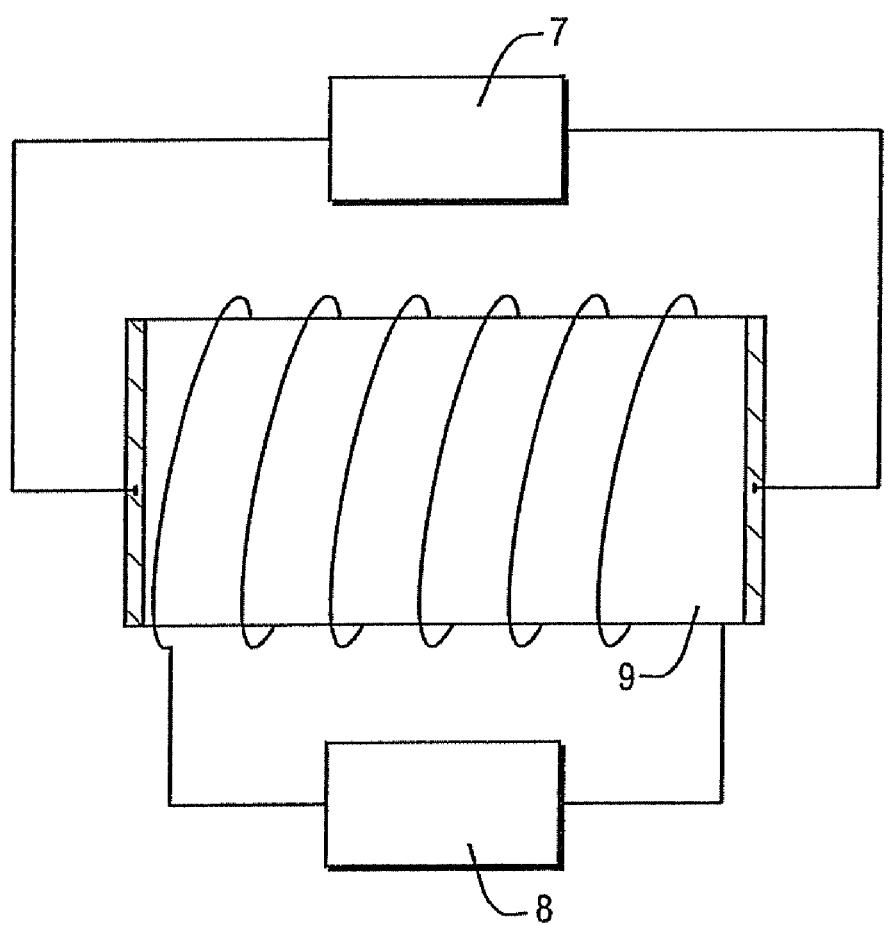
FIG. 3 is a schematic drawing of an embodiment of the invention in the case of magnetoelectric materials.

Referring to FIG. 3, similarly magnetoelectric materials may be used in the invention as follows:

For magnetoelectric materials the constitutive equations analogous to Eqs. 1 are:

$$\mu_0 \cdot M = \mu_0 \cdot \chi_m \cdot H - \lambda \cdot E$$

$$P = \varepsilon_0 \cdot \chi_e \cdot E - \tau \cdot H \quad (3)$$

where $\lambda$ is the magnetization/electric-field coefficient and is a measure of the change in magnetization with electric field at constant magnetic field, and $\tau$ is the electric polarization/magnetic-field coefficient and is a measure of the change in the electric polarization with magnetic field at constant electric field. In this case $\lambda$ and $\tau$ are the cross coupling coefficients.

To demonstrate the operation of the invention to generate electrical energy via the electric field, in such a manner that there is a net energy loss in the material's internal energy, we use a material (9) in which $\tau$ is larger than $\lambda$. We also assume the material (9) is subjected to a sinusoidal electric field from a first electrical system (7). A magnetic field from a second electrical system (8) is used to control the electrical polarization. The magnetic field and electric field are:

$$H = H_0 \cdot \sin(\theta)$$

$$E = E_0 \cdot \cos(\theta)$$

where $\theta$ is the phase angle of the cycle period (i.e., $\theta = 2\pi$ represents a complete cycle).

Using the constitutive equations (Eqs. 3) we can now calculate the total electrical work per unit volume done on the material (9) by the second electrical system (8) over the complete cycle as:

$$W'_e = \oint \mu_0 \cdot H \cdot dM$$

$$= H_0 \oint \sin(\theta) \cdot (\mu_0 \cdot \chi_m \cdot H_0 \cdot \cos(\theta) + \lambda \cdot E_0 \cdot \sin(\theta)) \cdot d\theta$$

$$= \pi \cdot \lambda \cdot H_0 \cdot E_0$$

This value is positive representing the fact that electrical energy from the second electrical system (8) has been supplied to the material (9) with a corresponding gain in the material's internal energy after a complete cycle.

Using again the constitutive equations (Eqs. 3) we can now calculate the total electrical work per unit volume done on the material (9) by the first electrical system (7) over the complete cycle as:

$$W_e = \oint E \cdot dP$$

$$= E_0 \oint \cos(\theta) \cdot (-\varepsilon_0 \cdot \chi_e \cdot E_0 \sin(\theta) - \tau \cdot H_0 \cdot \cos(\theta)) \cdot d\theta$$

$$= -\pi \cdot \tau \cdot H_0 \cdot E_0$$

This value is negative representing the fact that after a complete cycle electrical energy has been generated and supplied to the first electrical system (7) from the material (9) with a corresponding loss in the material's internal energy.

Since we have chosen to use a material (9) in which $\tau$ is larger than $\lambda$ the material's internal energy has a net loss after a complete cycle in which the material (9) has returned to its original magnetoelectric state.

It is to be appreciated that there is no requirement at any time in the operation of the invention that the temperature of the material be raised above the ambient temperature.

To demonstrate the operation of the invention to generate electric energy via the magnetic field in such a manner that there is a net energy loss in the material's internal energy, we use again a material (9) in which $\tau$ is smaller than $\lambda$. We also assume the material (9) is subjected to a sinusoidal magnetic field from a second electrical system (8). An electric field from a first electrical system (7) is used to control the magnetization. The magnetic field and electric field are:

$$H = H_0 \cdot \sin(\theta)$$

$$E = -E_0 \cdot \cos(\theta)$$

where $\theta$ is the phase angle of the cycle period (i.e., $\theta = 2\pi$ represents a complete cycle).

Using the constitutive equations (Eqs. 3) we can now calculate the total electrical work per unit volume done on the material (9) by the second electrical system (8) over the complete cycle as:

$$W'_e = \oint \mu_0 \cdot H \cdot dM$$

$$= H_0 \oint \sin(\theta) \cdot (\mu_0 \cdot \chi_m \cdot H_0 \cdot \cos(\theta) - \lambda \cdot E_0 \cdot \sin(\theta)) \cdot d\theta$$

$$= -\pi \cdot \lambda \cdot H_0 \cdot E_0$$

This value is negative representing the fact that after a complete cycle electrical energy has been generated and supplied to the second electrical system (8) from the material (9) with a corresponding loss in the material's internal energy.

Using again the constitutive equations (Eqs. 2) we can now calculate the total electrical work per unit volume done on the material (9) by the first electrical system (7) over the complete cycle as:

$$W_e = \oint E \cdot dP$$
$$= -E_0 \oint \cos(\theta) \cdot (\varepsilon_0 \cdot \chi_e \cdot E_0 \sin(\theta) - \tau \cdot \sigma_0 \cdot \cos(\theta)) \cdot d\theta$$
$$= \pi \cdot \tau \cdot \sigma_0 \cdot E_0$$

This value is positive representing the fact that electrical energy from the first electrical system (7) has been supplied to the material (9) with a corresponding gain in the material's internal energy after a complete cycle.

Since we have chosen to use a material in which $\tau$ is smaller than $\lambda$ the material's internal energy has a net loss after a complete cycle in which the material (9) has returned to its original magnetoelectric state.

It is to be again appreciated that there is no requirement at any time in the operation of the invention that the temperature of the material be raised above the ambient temperature.

Another interesting embodiment of the invention can be shown (in the case of magnetostrictive materials) when the material's permeability and elastic compliance (the inverse of the elastic modulus) may be considered linear functions of the cross coupling forces[5]. For example, the constitutive equations in this case are:

[5] In the case of piezo-electric or magneto-electric materials there are perfectly analogous relationships.

$$s = C(H) \cdot \sigma = (K + \kappa \cdot H) \cdot \sigma$$

$$B = \mu(\sigma) \cdot H = (K' + \eta \cdot \sigma) \cdot H \quad (4)$$

where B is the magnetic induction, K and $\kappa$ are constants in the expression for the compliance C(H), and where K' and $\eta$ are constants in the expression for the permeability $\mu(\sigma)$.

Referring to FIG. 1, the material (3) is subjected to a sinusoidal stress from a mechanical system (1). Control of the material's compliance is accomplished by a magnetic field from an electrical system (2) having twice the frequency of the stress such that:

$$H = \sin(2 \cdot \theta)$$

$$\sigma = \sin(\theta)$$

(for simplicity we are assuming unit amplitudes of the stress and magnetic field) the operation of the invention is achieved as shown by the following:

Using Eq. 4, the total mechanical work per unit volume done on the material (3) by the mechanical system (1) over the complete cycle is:

$$W_m = \oint \sigma \cdot ds$$
$$= \oint \sin(\theta) \cdot d((K + \kappa \cdot \sin(2 \cdot \theta)) \cdot \sin(\theta))$$
$$= \oint \sin(\theta)(K + \kappa \cdot \sin(2 \cdot \theta)) \cdot \cos(\theta) \cdot d\theta + 2 \cdot$$
$$\kappa \cdot \sin^2(\theta) \cdot \cos(2 \cdot \theta) \cdot d\theta$$

The term containing K cancels over the complete cycle. Also with the help of trigonometric identities this becomes:

$$W_m = \oint \left( \frac{1}{2} \kappa \cdot \sin^2(2 \cdot \theta) + \kappa \cdot (1 - \cos(2 \cdot \theta)) \cdot \cos(2 \cdot \theta) \right) \cdot d\theta$$

The term linear in $\cos(2 \cdot \theta)$ cancels over the complete cycle leaving $$W_m = \oint \left( \frac{1}{2} \kappa \cdot \sin^2(2 \cdot \theta) - \kappa \cdot \cos^2(2 \cdot \theta) \right) \cdot d\theta$$

Using again trigonometric identities and integrating over the complete cycle ($0 \leq \theta \leq 2 \cdot \pi$) finally gives $$W_m = -\frac{1}{2} \kappa \cdot \pi$$

This value being negative signifies an energy gain in the mechanic system (1) and an energy loss in the material (3). Again using Eq. 4, the total electrical work per unit volume done on the material (3) by the electrical system (2) over the complete cycle is (using also the relation $B = \mu_0 \cdot H + \mu_0 \cdot M$):

$$W_e = \oint \mu_0 \cdot H \cdot dM$$
$$= \oint (H \cdot dB - \mu_0 \cdot H \cdot dH)$$
$$= \oint \left( H \cdot dB - d\left( \frac{1}{2} \mu_0 \cdot H^2 \right) \right)$$
$$= \oint H \cdot dB$$
$$= \oint \sin(2 \cdot \theta) \cdot d((K' + \eta \cdot \sin(\theta)) \cdot \sin(2 \cdot \theta))$$
$$= \oint \binom{2 \cdot \sin(2 \cdot \theta)(K' + \eta \cdot \sin(\theta)) \cdot}{\cos(2 \cdot \theta) + \eta \cdot \sin^2(2 \cdot \theta) \cdot \cos(\theta)} \cdot d\theta$$

After some straightforward algebra and the use of trigonometric identities this integral is seen to be identically zero[6] (i.e., the electrical system (2) neither supplies energy to, nor receives energy from, the material (3), and no energy gain or loss in the material (3) after a complete cycle). The operation of the invention is achieved since the net result is again a net loss in the material's internal energy after a complete cycle.

[6] As before, hystereis and resistive energy loses are considered neglected in this analysis.

Also, it can be seen by the symmetry of the analysis that if the stress were twice the frequency of the magnetic field, the situation would be reversed in that the electrical system (2) would have an energy gain and the mechanical system (1) would neither supply energy to, nor receive energy from, the material (3) after a complete cycle.

In general, where the constitutive equations are not linear and the constitutive coefficients are not constants, the constitutive equations may be expressed in differential form as:

For magnetostrictive materials $$ds(\sigma, H) = \frac{d\sigma}{Y} - \alpha \cdot dH$$

$$\mu_0 \cdot dM(\sigma, H) = \mu_0 \cdot \chi_m \cdot dH - \beta \cdot d\sigma$$

For piezo-electric materials $$ds(\sigma, E) = \frac{d\sigma}{Y} - \delta \cdot dE$$

$$dP(\sigma, E) = \varepsilon_0 \cdot \chi_e \cdot dE - \gamma \cdot d\sigma$$

For magnetoelectric materials $$\mu_0 \cdot dM(E,H) = \mu_0 \cdot \chi_m \cdot dH - \lambda \cdot dE$$

$$dP(E,H) = \epsilon_0 \cdot \chi_e \cdot dE - \tau \cdot dH$$

The invention is operable whenever a material is selected which has relatively low hysteresis and resistive losses and where the material's cross coupling coefficients (in general not constants) are not equal to each other at the same operating points within a finite operating region[7].

[7] Even in materials where the hysteresis and resistive losses are not negligible the invention can be used to recover some, if not all, of these losses that would ordinarily be lost as heat.

I claim:

1. An energy transducer for the generation of useful work comprising a selected material having internal energy and in which there is a cross coupling between a first energy conjugate physical property of a variable primary force and a second energy conjugate physical property of a variable secondary force, said cross coupling being characterized by cross coupling coefficients that are not equal under conditions when said transducer is in operation, and in which said internal energy is used as an energy source, said transducer being operable in a cycle and being operable without the need to raise the temperature of said material above ambient temperature, said material being under the influence of said variable primary force through which said useful work is generated, said material also being under the influence of said variable secondary force which controls said first energy conjugate physical property to predetermined values.

2. An energy transducer as recited in claim 1 wherein:
said primary force being a magnetic field; and
said first energy conjugate physical property being magnetization.

3. An energy transducer as recited in claim 1 wherein:
said primary force being a mechanical stress; and
said first energy conjugate physical property being mechanical strain.

4. An energy transducer as recited in claim 2 wherein:
said secondary force being a mechanical stress.

5. An energy transducer as recited in claim 3 wherein:
said secondary force being a magnetic field.

6. A method of generating useful work using a selected material having internal energy and in which there is a cross coupling between a first energy conjugate physical property of a variable primary force and a second energy conjugate physical property of a variable secondary force, said cross coupling being characterized by cross coupling coefficients that are not equal under conditions when said method is in operation, and in which said internal energy is used as an energy source, said method being operable in a cycle and being operable without the need to raise the temperature of said material above ambient temperature comprising the steps of:
providing for said variable primary force to said material through which said useful work is generated; and
providing for said variable secondary force which controls said first energy conjugate physical property to predetermined values.

7. A method as recited in claim 6 wherein:
said primary force being a magnetic field; and
said first energy conjugate physical property being magnetization.

8. A method as recited in claim 6 wherein:
said primary force being a mechanical stress; and
said first energy conjugate physical property being mechanical strain.

9. A method as recited in claim 7 wherein:
said secondary force being a mechanical stress.

10. A method as recited in claim 8 wherein:
said secondary force being a magnetic field.

* * * * *